(No Model.) 2 Sheets—Sheet 1.
DE WITT C. PRESCOTT.
FEED AND PRESSURE MECHANISM FOR SAW MILLS.
No. 363,169. Patented May 17, 1887.
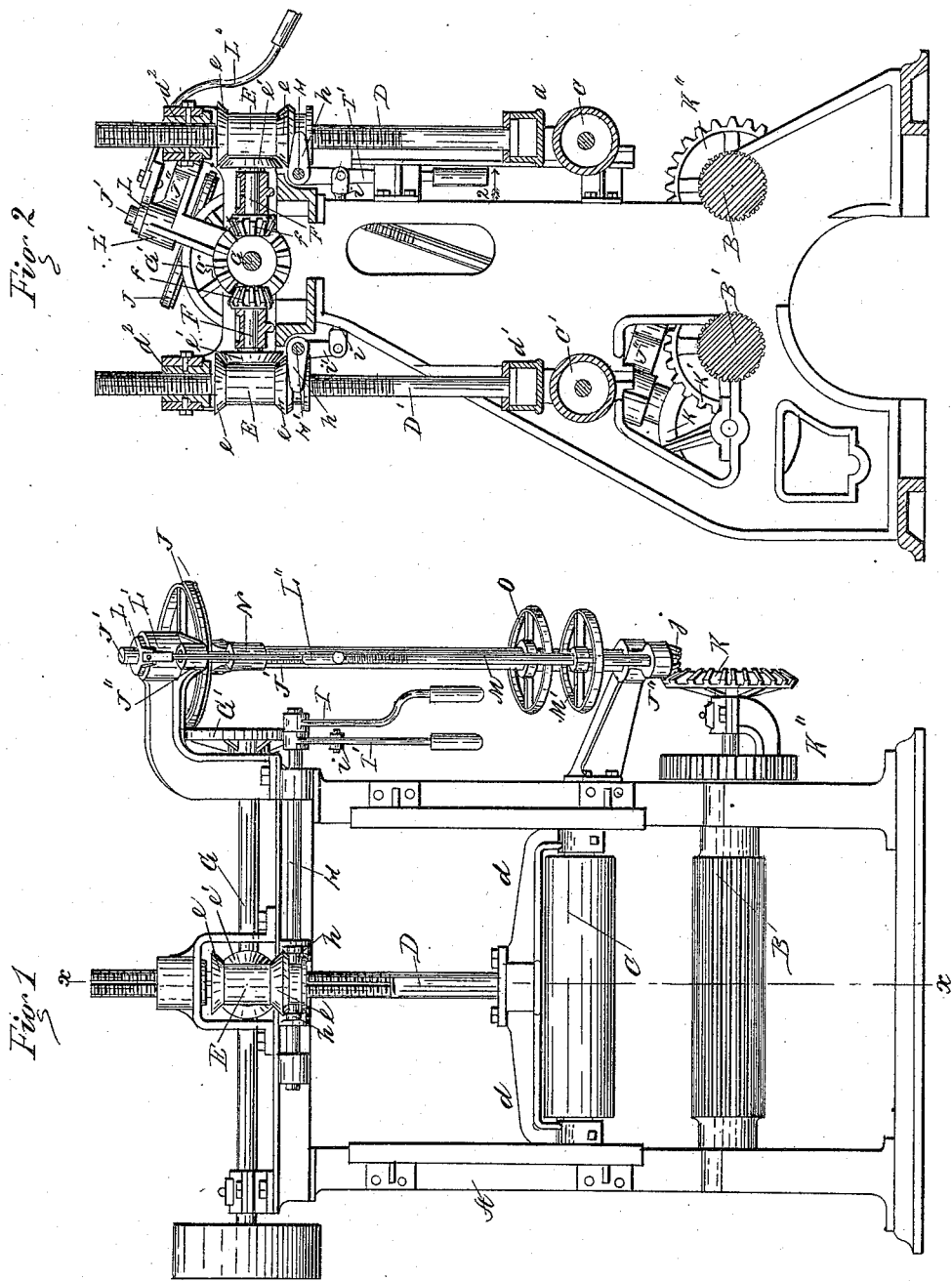
Witnesses
W. C. Coolies
P. E. Rennemo.
Inventor
De Witt C. Prescott
By Coburn Thacher
Attorneys (No Model.) 2 Sheets—Sheet 2.
DE WITT C. PRESCOTT.
FEED AND PRESSURE MECHANISM FOR SAW MILLS.
No. 363,169. Patented May 17, 1887.
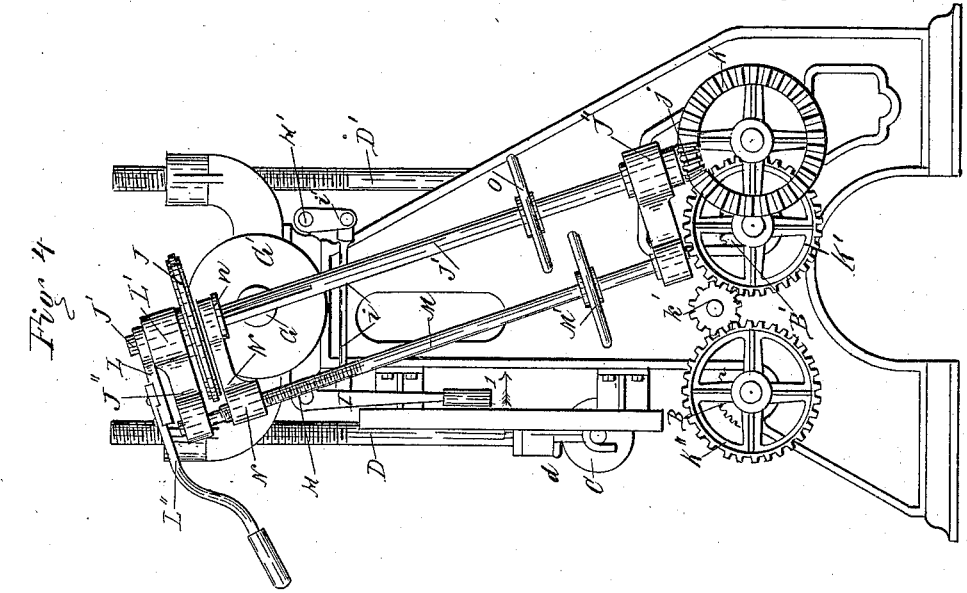
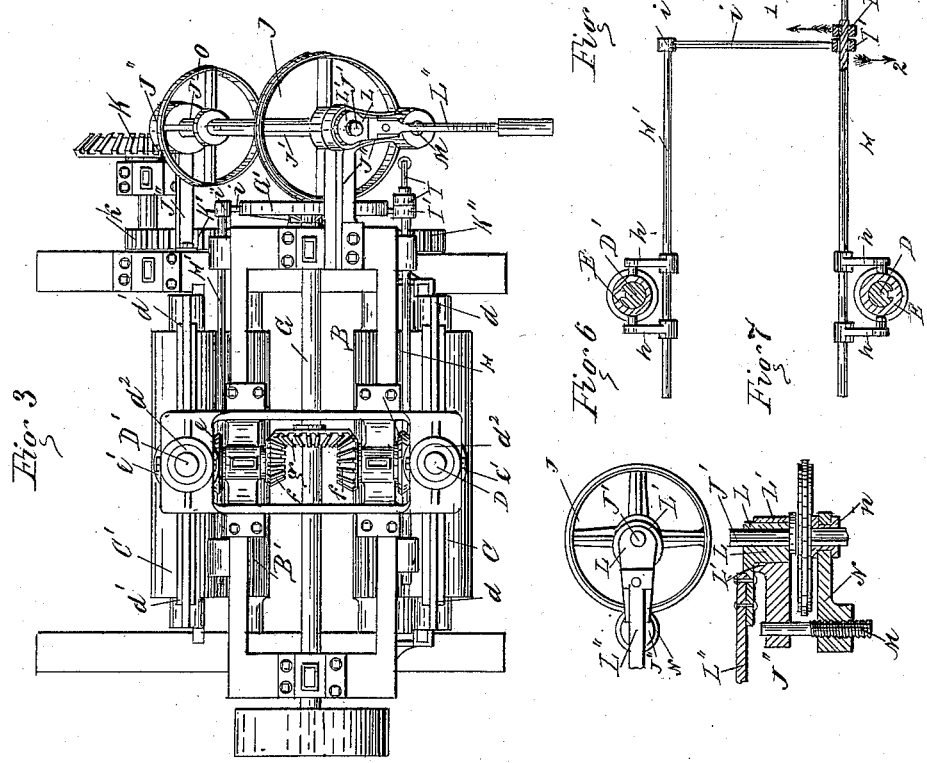
Witnesses
W. C. Coilies
P. E. Rennamo
Inventor
De Witt C. Prescott
By Coburn & Thacher
Attorneys

UNITED STATES PATENT OFFICE.

DE WITT CLINTON PRESCOTT, OF MARINETTE, WISCONSIN.

FEED AND PRESSURE MECHANISM FOR SAW-MILLS.

SPECIFICATION forming part of Letters Patent No. 363,169, dated May 17, 1887.

Application filed July 28, 1884. Serial No. 138,948. (No model.)

*To all whom it may concern:*

Be it known that I, DE WITT CLINTON PRESCOTT, a citizen of the United States, residing at Marinette, in the county of Marinette and State of Wisconsin, have invented certain new and useful Improvements in Feed and Pressure Mechanism for Gang-Saw Mills, which are fully set forth in the following specification, reference being had to the accompanying drawings, in which—

Figure 1 is a front elevation of a machine embodying my invention; Fig. 2, a sectional view on the line $x\ x$ of Fig. 1; Fig. 3, a plan view; Fig. 4, a side elevation; and Figs. 5, 6, and 7, detail views.

My invention relates to saw-mills, and more particularly to the feed and pressure mechanism thereof. In the present instance I have shown my devices applied to a gang-saw mill of a kind for which I have already made application for Letters Patent; but their use is of course not limited to that particular description of saw-mill.

In the drawings, A indicates a frame of suitable construction to receive the gang of saws, which are operated by any suitable mechanism, the material to be operated upon being fed along by feed-rollers B B', against which it is held by pressure-rollers C C'. The pressure-rollers are journaled in cross-heads $d\ d'$, sliding in suitable ways on the main frame A, and are independently operated by the screw-shafts D D', which are swiveled in the cross-heads and pass through nuts $d^2$, secured in the upper part of frame A, as clearly shown in Fig. 2 of the drawings.

It is obvious that a rotation of the shaft D will raise or lower the pressure-roller C, and similarly the roller C' will be adjusted by the rotation of the shaft D'. In order to effect this adjustment there is splined on each of the said shafts, so as to slide longitudinally thereon, a sleeve, E, furnished at each end with a beveled or miter friction-wheel, $e$, either one of which may be brought into contact with a similar wheel, $e'$, on a short shaft, F, journaled in the upper part of the frame. The inner ends of these shafts F are each provided with a bevel-gear, $f$, and these bevel-gears engage a large bevel-gear, $g$, on a shaft, G, suitably connected with the power which is employed to drive the mill.

The lower part of the sleeves are grooved to receive the suitably-formed ends of two arms, $h$, secured on rock-shafts H and H', suitably mounted in the frame. The rock-shaft H has secured thereto a lever, I, and on this same shaft there is mounted loosely a lever, I', connected by a link, $i$, with a crank-arm, $i'$, on the rock-shaft H'.

It is obvious that a movement of the lever I in the direction of the arrow 1, Fig. 5, will rotate rock-shaft H, and thereby bring the friction-wheel $e$ on the upper end of the sleeve E on shaft D in contact with friction-wheel $e'$, thereby rotating shaft D and lowering the pressure-roller C upon the work, which is then held against the feed-rollers. A movement in the reverse direction will bring the lower friction-wheel in contact with wheel $e'$, which will rotate sleeve E and shaft D in the reverse direction, thereby raising pressure-roller C. In a similar manner I', when moved in the direction of the arrow 2, Fig. 5, will lower pressure-roller C', and by a reverse movement raise it. When the levers are in the position represented in Fig. 1—*i. e.*, vertical—neither of the wheels $e$ is in contact with wheel $e'$, and the pressure-rollers remain stationary.

The feed-rolls are driven by the following mechanism: On the end of shaft G is secured a friction-plate, G', which, by means of a friction-wheel, J, rotates a shaft, J', extending from the upper to the lower part of the machine, and journaled in suitable arms, J'', projecting therefrom. On the lower end of this shaft is a small bevel-pinion, $j$, meshing with a larger bevel-gear, K, turning on its shaft a pinion, $k$, Fig. 3. This pinion meshes with a gear-wheel, K', on the shaft of the feed-roller B', and this gear-wheel K', by means of an idle-pinion, $k'$, gives motion to a gear-wheel, K'', on the shaft of the feed-roller B. Motion is thus imparted to both feed-rollers in the same direction to feed the material to be operated upon through the machine.

In order to enable the operator to stop or start the feed-rollers without stopping or starting the prime mover, I employ the construction shown in detail in Figs. 6 and 7, wherein the upper end of the shaft J' is shown journaled in an eccentric, L, mounted in a suitable housing, L', in the arm J''. To this eccentric a lever, L'', is attached, which serves to rotate the eccentric and throw the upper end of shaft J″ in or out, thus moving wheel J into or out of contact with friction-plate G′, and thereby starting or stopping the feed-rollers.

The speed of the feed-rollers is regulated, independently of that of the prime mover, by means of a shaft, M, having a hand-wheel, M′, thereon, and journaled in the arms J″. The upper end of this shaft is screw-threaded and passes through a tapped hole in the end of an arm, N, the other forked end of which fits in a groove in the hub $n$ of the wheel J, and the said wheel is splined on shaft J′, so as to rotate with and slide longitudinally thereon. By this construction it will be seen that a rotation of the hand-wheel M′ will move the arm N and wheel J up or down—i. e., the wheel J will be moved nearer to the center or to the periphery of the friction-plate G′—thereby diminishing or increasing, as desired, the speed of shaft J′ and the feed-rollers operated thereby.

I have shown secured to shaft J′ a hand-wheel, O, whereby, the friction-wheels G′ and J being out of contact, the shaft J′ may be rotated backward by hand to reverse temporarily the direction of the feed-rollers, when desired.

It will be observed that the three levers, I, I′, and L″, which control the pressure and feed rollers, are all grouped together at the upper corner of the front of the machine, where they are all within easy reach of the operator, who is thus enabled to control the whole machine without moving from his position.

I do not wish to be understood as limiting myself to the precise details of construction hereinbefore described and shown in the drawings, as many obvious mechanical changes may be made therein, especially in adapting my feed and pressure mechanism to machines of a character different from the one herein shown and described, without departing from the spirit of my invention.

I am aware of Letters Patent No. 291,257, granted January 1, 1884, to Theodore S. Wilkin, and I therefore do not wish to be understood as claiming anything set forth in said Letters Patent.

Having thus described my invention, what I claim as new, and desire to secure by Letters Patent, is—

1. In a gang-saw mill, the combination, with a pressure-roller and its supporting-yoke, of a vertical shaft swiveled in said yoke and having its upper extremity screw-threaded, a fixed nut through which said threaded extremity passes, a sleeve provided with friction-surfaces at its ends and splined upon the vertical shaft to move in a right line thereon, and a non-adjustable friction-wheel suitably connected to the prime mover and arranged between the ends of the sleeve to engage with either friction-surface thereof, substantially as and for the purposes specified.

2. In a gang-saw mill, the combination, with the pressure-rollers C C′ and their yokes, of the threaded shafts D D′, swiveled in said yokes, the fixed nuts $d^2$, through which said threaded shafts pass, the sleeves E E′, splined on said shafts, adjustable in a right line thereon and having the friction-wheels $e$ at each end, and the non-adjustable shafts F, having friction-wheels $e'$, arranged between the friction-wheels $e$ to engage with either one of the same, said shafts F being suitably connected to the prime mover, substantially as and for the purposes specified.

3. The combination, with the sleeves E E′, having the groove therein, of the arms $h$, secured to rock-shafts H H′, lever I, secured to rock-shaft H, and lever I′, mounted on said rock-shaft and connected by link $i$ to the arm $i'$ of rock-shaft H′, substantially as and for the purposes set forth.

4. In a gang-saw mill, the combination, with the shaft G and friction-plate G′, of the shaft J′, carrying the friction-wheel J and having its upper end journaled in the eccentric L and its lower end connected by suitable gearing with the feed-rollers, substantially as and for the purpose specified.

5. In a gang-saw mill, the combination, with the shaft G, suitably connected to the prime mover, of the pressure-rollers and their vertical threaded shafts passing through fixed nuts in the frame and actuated by friction-gearing driven from the said shaft G and the feed-rollers and their driving mechanism connected to the said shaft G by means of a shaft, J′, geared to the driving mechanism and driven from the shaft G by means of suitable friction-gears, substantially as and for the purposes specified.

6. In a gang-saw mill, the combination, with plate G′, of the shaft J′, having its lower end connected by suitable gearing with the feed-rollers and its upper end mounted in the eccentric L, and the friction-wheel J, splined on said shaft and having its grooved hub engaged by an arm, N, threaded to receive the screw-shaft M, substantially as and for the purposes specified.

7. In a gang-saw mill, the combination, with the nuts $d^2$ and the pressure-rollers and their threaded shafts, of the sleeves E E′, splined on said shafts and having friction-surface $e$, the arms $h$, engaging grooves in the sleeves, rock-shafts H H′, to which said arms are secured, arms I′ $i'$, secured to their respective rock-shafts, link $i$, connecting said arms, and an operating-lever secured to one of the rock-shafts, substantially as and for the purposes specified.

DE WITT CLINTON PRESCOTT.

Witnesses:
JOHN J. ANDREW,
BION B. PENNELL.